(12) United States Patent
Yamaguchi et al.

(10) Patent No.: US 7,920,737 B2
(45) Date of Patent: Apr. 5, 2011

(54) CODE IMAGE PROCESSING METHOD AND CODE IMAGE PROCESSING APPARATUS

(75) Inventors: Nobuyasu Yamaguchi, Kawasaki (JP); Tsugio Noda, Hadano (JP)

(73) Assignee: Fujitsu Limited, Kawasaki (JP)

( * ) Notice: Subject to any disclaimer, the term of this patent is extended or adjusted under 35 U.S.C. 154(b) by 1034 days.

(21) Appl. No.: 11/783,056

(22) Filed: Apr. 5, 2007

(65) Prior Publication Data
US 2008/0013817 A1 Jan. 17, 2008

(30) Foreign Application Priority Data
Jul. 11, 2006 (JP) .................................. 2006-190259

(51) Int. Cl.
*G06K 9/00* (2006.01)
(52) U.S. Cl. .................................... 382/139; 382/100
(58) Field of Classification Search .................. 382/100, 382/112–113, 135, 137, 139, 175–176, 180–183, 382/191, 232–239, 243–248, 254, 280, 289, 382/296, 298; 713/176; 258/401, 403, 448; 235/454, 462.01–462.09, 462.1, 462.11
See application file for complete search history.

(56) References Cited

U.S. PATENT DOCUMENTS

| | | | |
|---|---|---|---|
| 6,195,128 B1 * | 2/2001 | Streater | 375/240.12 |
| 6,250,551 B1 | 6/2001 | He et al. | |
| 6,556,688 B1 | 4/2003 | Ratnakar | |
| 6,775,394 B2 | 8/2004 | Yu | |
| 6,883,716 B1 | 4/2005 | De Jong | |
| 7,237,722 B2 * | 7/2007 | Zhu et al. | 235/472.01 |
| 2004/0001608 A1 | 1/2004 | Rhoads | |
| 2004/0042670 A1 | 3/2004 | Moroo et al. | |
| 2004/0234139 A1 | 11/2004 | Moroo et al. | |
| 2005/0103866 A1 * | 5/2005 | Zhu et al. | 235/462.45 |

(Continued)

FOREIGN PATENT DOCUMENTS
EP 0 942 418 9/1999
(Continued)

OTHER PUBLICATIONS

Bender et al., "Techniques for data hiding", IBM Systems Journal, vol. 35, No. 3-4, 1996, pp. 313-335.

(Continued)

*Primary Examiner* — Samir A Ahmed
*Assistant Examiner* — Mehdi Rashidian
(74) *Attorney, Agent, or Firm* — Staas & Halsey LLP

(57) ABSTRACT

The present invention relates to methods of automatically determining and recognizing a code included in image data, and, more particularly, to a method capable of determining not only a one-dimensional code and a two-dimensional code but also a steganographic code with certainty.

A code image processing method according to an embodiment of the present invention includes: a block extracting step of extracting a rectangular block unit area from image data; a block feature value calculating step of calculating the feature value of a code included in the rectangular block unit area; a block determining step of determining the type of the code included in the rectangular block unit area on the basis of the feature value of the code; and a code processing selecting step of selecting processing to be performed on the basis of the determined code type. According to the image processing method, it can be accurately determined whether a rectangular block unit area includes a steganographic code by using a steganographic feature value to determine the type of a code included in the rectangular block unit area.

13 Claims, 18 Drawing Sheets

U.S. PATENT DOCUMENTS

2005/0121520 A1    6/2005    Yamaguchi et al.

FOREIGN PATENT DOCUMENTS

| | | |
|---|---|---|
| EP | 1 619 604 | 1/2006 |
| JP | 2000-299778 | 10/2000 |
| JP | 2003-516572 | 5/2003 |
| JP | 2004-94551 | 3/2004 |
| JP | 2004-179783 | 6/2004 |
| JP | 2004-349879 | 12/2004 |
| JP | 2005-173646 | 6/2005 |
| JP | 2005-520426 | 7/2005 |

OTHER PUBLICATIONS

Extehded European Search Report issued in corresponding European Patent Application No. 07110799.9, on Nov. 8, 2007.

* cited by examiner

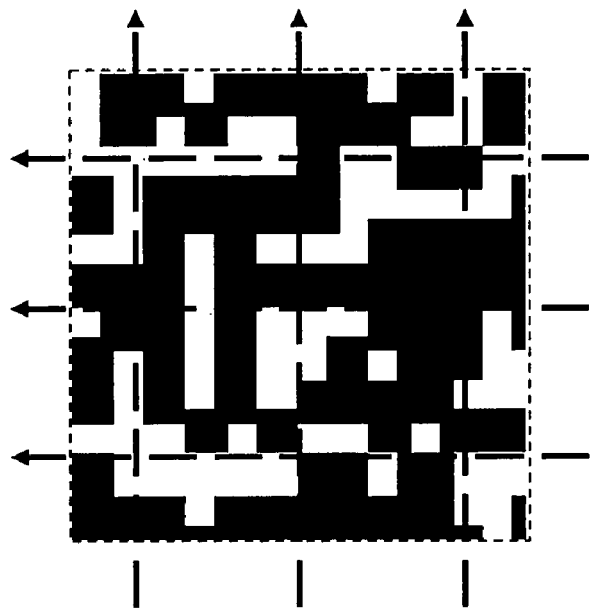
A two-dimensional code
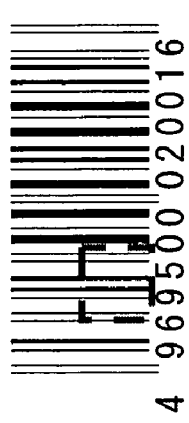
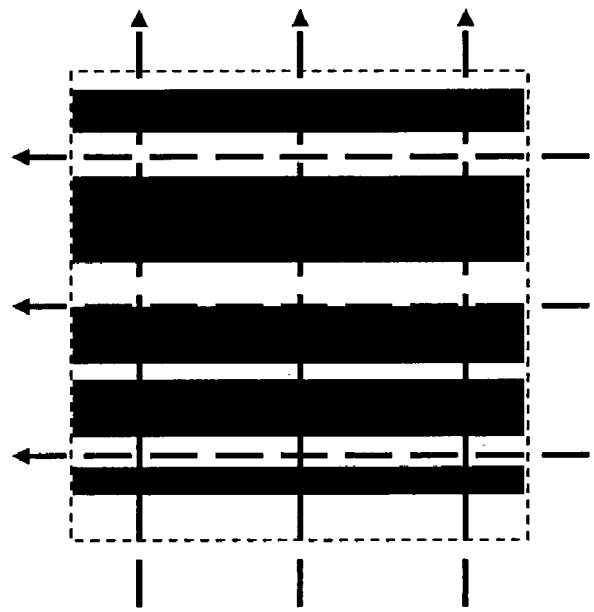
A one-dimensional code
Fig.7

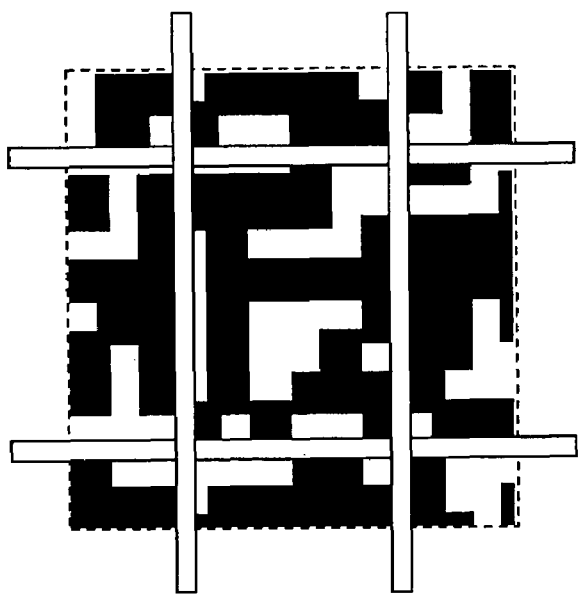
A two-dimensional code
Fig.8
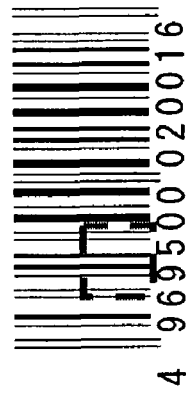
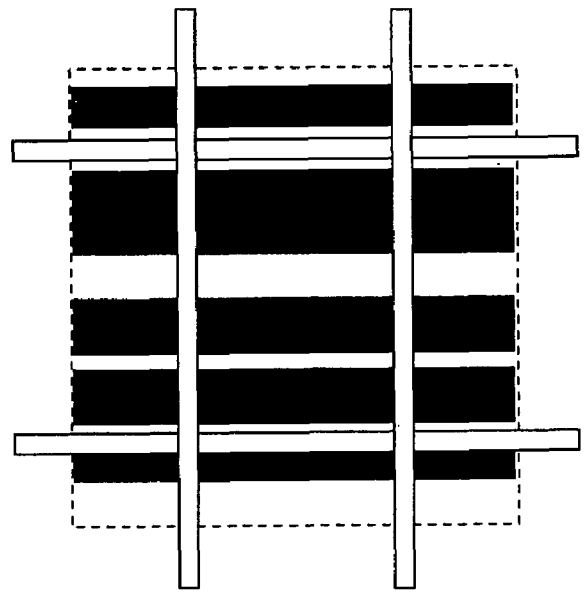
A one-dimensional code

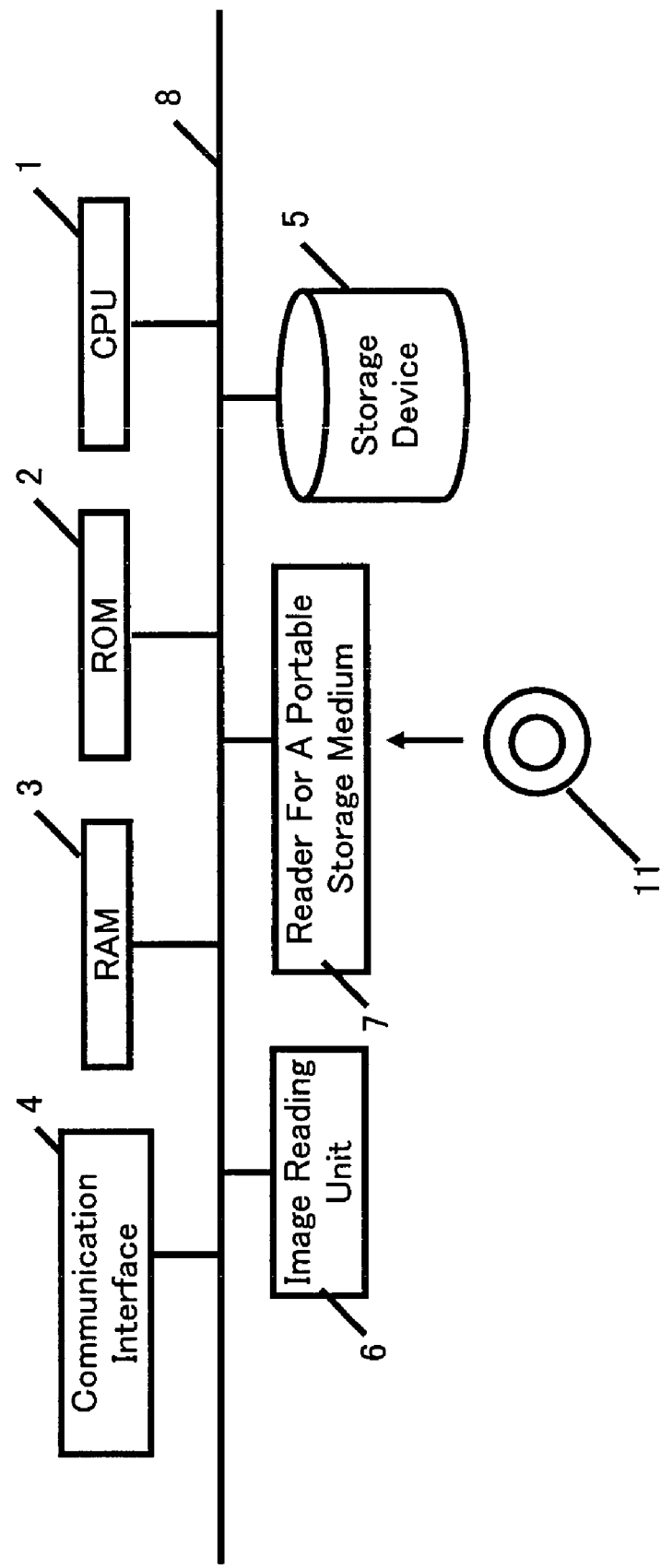

CODE IMAGE PROCESSING METHOD AND CODE IMAGE PROCESSING APPARATUS

BACKGROUND OF THE INVENTION

1. Field of the Invention

The present invention relates to methods of determining and recognizing the type of a code included in image data, and, more particularly, to a method of determining not only a one-dimensional code and a two-dimensional code but also a steganographic code with certainty.

2. Description of the Related Art

Recently, two-dimensional codes into which more information can be embedded compared with one-dimensional codes have been widely used. Since a two-dimensional code cannot be recognized without using data on the entire two-dimensional array of the code, an image reader such as a digital camera or an image scanner is used as a reader for the two-dimensional code. Furthermore, an image reader that automatically recognizes both one-dimensional codes and two-dimensional codes has been commercialized. Thus, various code reading techniques have been proposed.

For example, there is a technique in which image data is partitioned into units of rectangular blocks and it is determined whether the image features of a rectangular block unit area satisfy given conditions by scanning to determine whether the rectangular block unit area exists in a code area of a specified type. This technique is proposed in Japanese Unexamined Patent Application Publication No. 2005-173646.

In addition, for example, steganography in which data is invisibly embedded into an image has been brought into active use. Steganography is a technique in which image data is divided into a plurality of unit areas, and codes are embedded into an image on the basis of a magnitude relationship between the unit areas in terms of a feature value such as an average density. The features of an image generated using the technique is different from those of a one-dimensional or two-dimensional code. This technique is proposed in Japanese Unexamined Patent Application Publication No. 2004-349879

In the above-described known methods, as shown in FIG. 1, since code area determination was performed on the basis of the image features of a one-dimensional code (the level of line correlation is high, and there are always edges in one direction) and the image features of a two-dimensional code (there are edges in vertical and horizontal directions, and a black pixel ratio is 50%), in the case of the steganographic code having different features from those of the one-dimensional and two-dimensional codes, code area determination could not be performed. Accordingly, in order to recognize the steganographic code, recognition processing was required to be started from a specified area regardless of whether the steganographic, code area was included in image data. This resulted in a long processing time and a recognition failure. In addition, a user had to explicitly specify a steganographic code area, therefore, the methods were very inconvenient.

SUMMARY OF THE INVENTION

One aspect is an image processing apparatus comprising a central processing unit for controlling a process of determining a type of code included in image data comprising a plurality of blocks, each block comprising a plurality of pixels. The process comprises detecting either a maximum position where the degree of pixel value of a predetermined area is higher than that of another area in one of said block, or a minimum position where the degree of pixel value of a predetermined area is lower than that of another area in said block, repeating said detecting maximum or minimum position in other blocks, and determining a type of code included in said image data on the basis of the interval of the maximum and minimum positions detected.

According to an embodiment of the present invention, even in the case of steganographic code recognition, code, area determination can be performed, and recognition processing can be started in a code area with certainty. Accordingly, a short processing time and the improvement of the recognition processing can be achieved. In addition, since a user does not have to specify a code area, this can reduce the workload of the user. Thus, an easier-to-use code image processing method and code image processing apparatus can be provided.

BRIEF DESCRIPTION OF THE DRAWINGS

FIG. 7 is a diagram describing a method of determining the number of edges in a code;

FIG. 8 is a diagram describing a method of determining a correlation between two lines in a code;

FIG. 12 is a diagram describing program loading into a computer according to an embodiment of the present invention.

DESCRIPTION OF THE PREFERRED EMBODIMENTS

Embodiments of the present invention will be described with reference to the accompanying drawings.

First Embodiment

In the first embodiment, a method of determining whether a selected rectangular block unit area is included in a steganographic code area by calculating the feature value of a steganographic code will be described.

Figure 1:
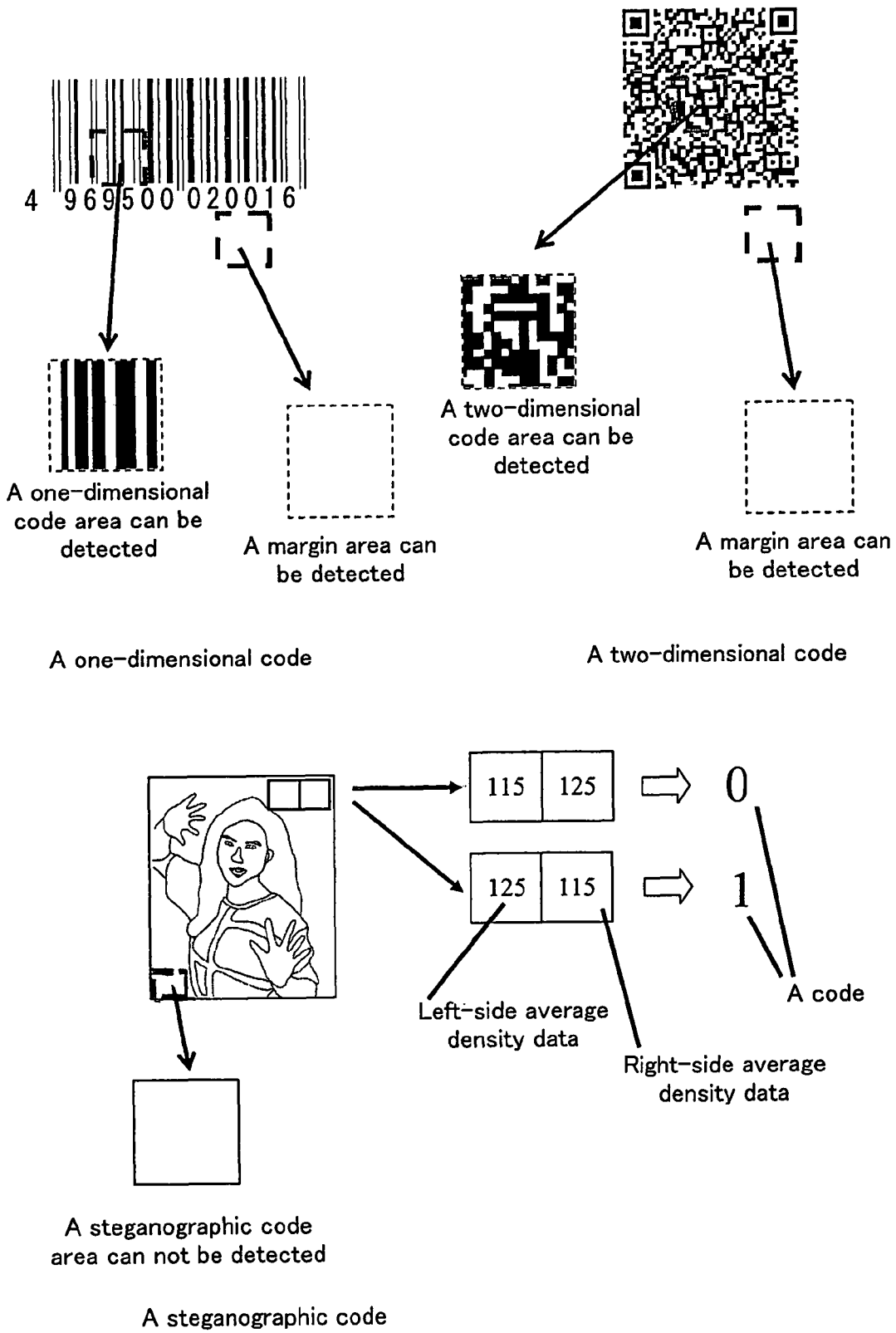
FIG. 1 is a diagram showing an exemplary one-dimensional code, two-dimensional code, and steganographic code.

First, a one-dimensional code, a two-dimensional code, and a steganographic code to which a code image processing method according to an embodiment of the present invention is applied will be described with reference to FIG. 1. The one-dimensional code is composed of a combination of parallel straight lines of different widths and different spacings. The two-dimensional code is created by representing data as cells and two-dimensionally arranging the cells. A single cell generally corresponds to a plurality of pixels. The two-dimensional code shown in FIG. 1 is called a quick response (QR) code which is characterized by there being positioning symbols disposed at the upper right, upper left, and lower left corners in a code area. The presence of these positioning symbols enables quick code recognition. The steganographic code is generated by dividing an image into a predetermined number of blocks, calculating the feature values such as the densities of two blocks that are adjacent to each other (a pair of blocks), and embedding a code on the basis of a magnitude relationship between the adjacent blocks in terms of the feature values. As shown in FIG. 1, an input image is divided into a plurality of blocks to generate pairs of blocks. In a pair of blocks, the average density (i.e. pixel value) of the left block (an average gradation value of pixels included in the block) is represented as left-side average density data $D_l$, and the average density of the right block is represented as right-side average density data $D_r$. If the left-side average density data $D_l$ is less than the right-side average density data $D_r$, the pair of blocks indicates "0" as a code of one bit. On the other hand, if the left-side average density data $D_l$ is equal to or larger than the right-side average density data Dr, the pair of blocks indicates "1" as a code of one bit.

Figure 13:
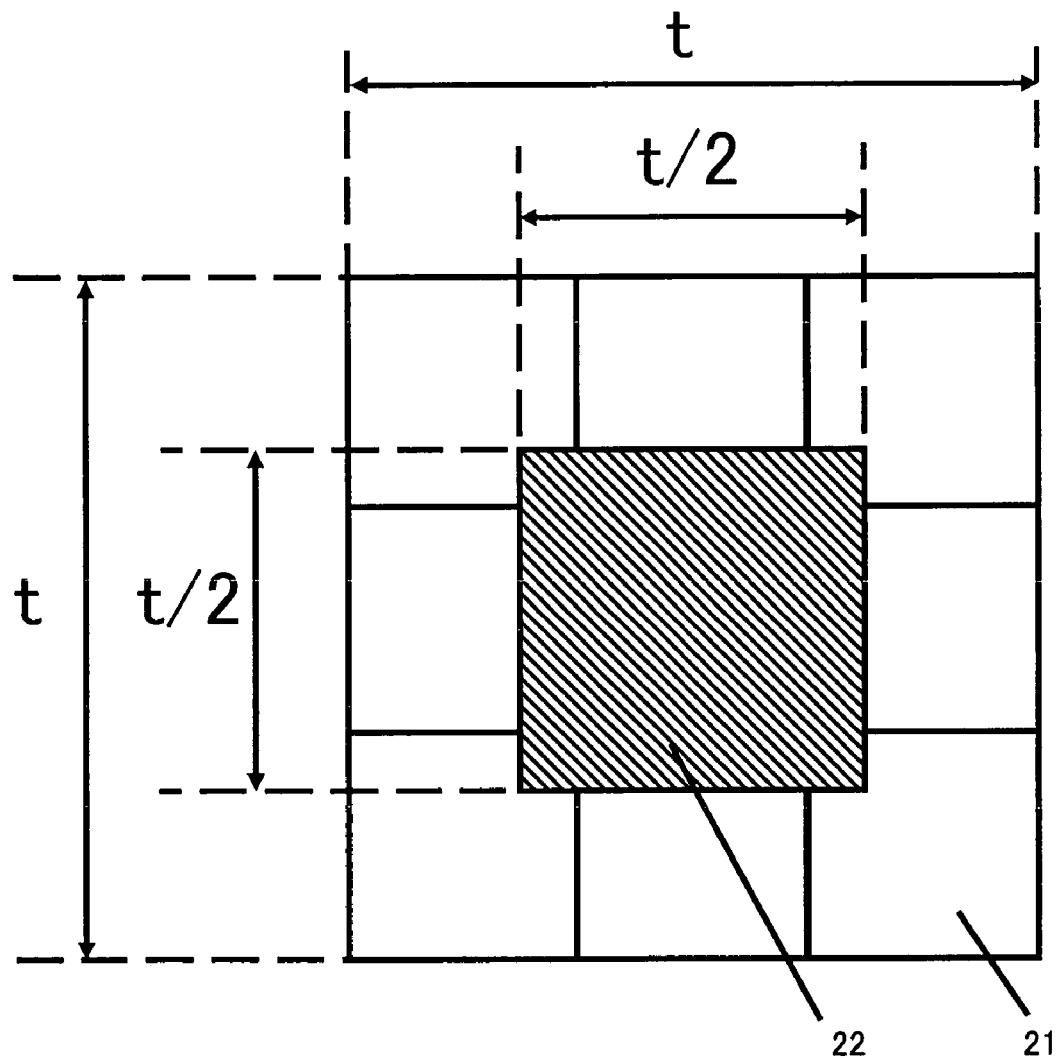
FIG. 13 is a diagram describing relationship between a block and an area.

FIG. 13 is a diagram describing relationship between a block 20 and a predetermined area (i.e. target area) 22. For example, a block 20 is comprised of 9 pixels 21. The length of the block 20 is t, and the length of the predetermined area 22 is t/2. The predetermined area 22 is positioned at a center of the block 20.

Figure 2:
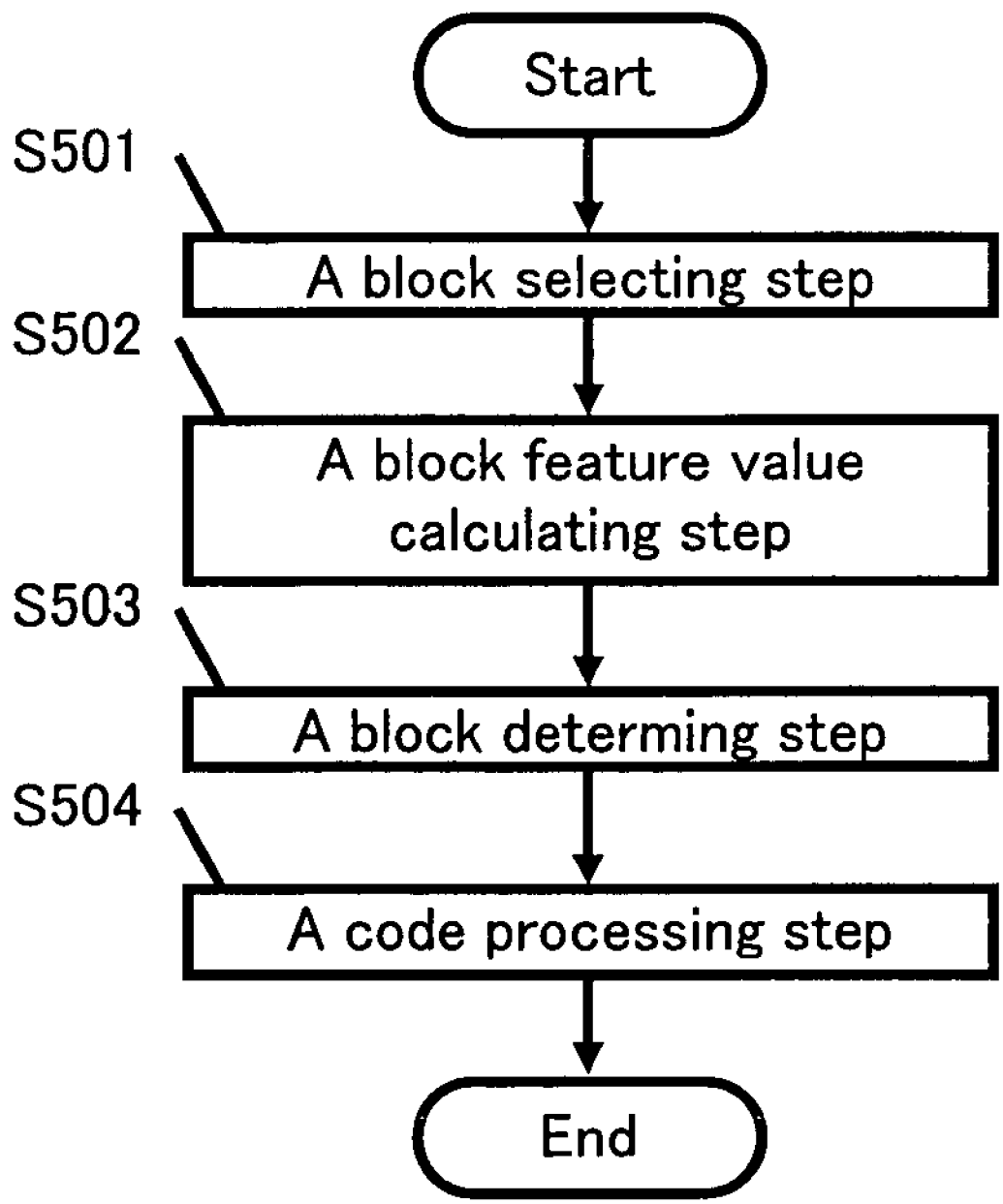
FIG. 2 is a diagram of the principle of a code image processing method according to an embodiment of the present invention.

FIG. 2 is a diagram describing the principle of a code image processing method according to an embodiment of the present invention. Referring to FIG. 2, the code image processing method according to an embodiment of the present invention includes a block selecting step of selecting a rectangular block unit area in input image data (step S501), a block feature value calculating step of calculating the feature value of the selected block (step S502), a block determining step of determining whether the selected block satisfies a predetermined condition (step S503), and a code processing step of processing a code included in the block satisfying the predetermined condition (step S504).

Figure 3A:
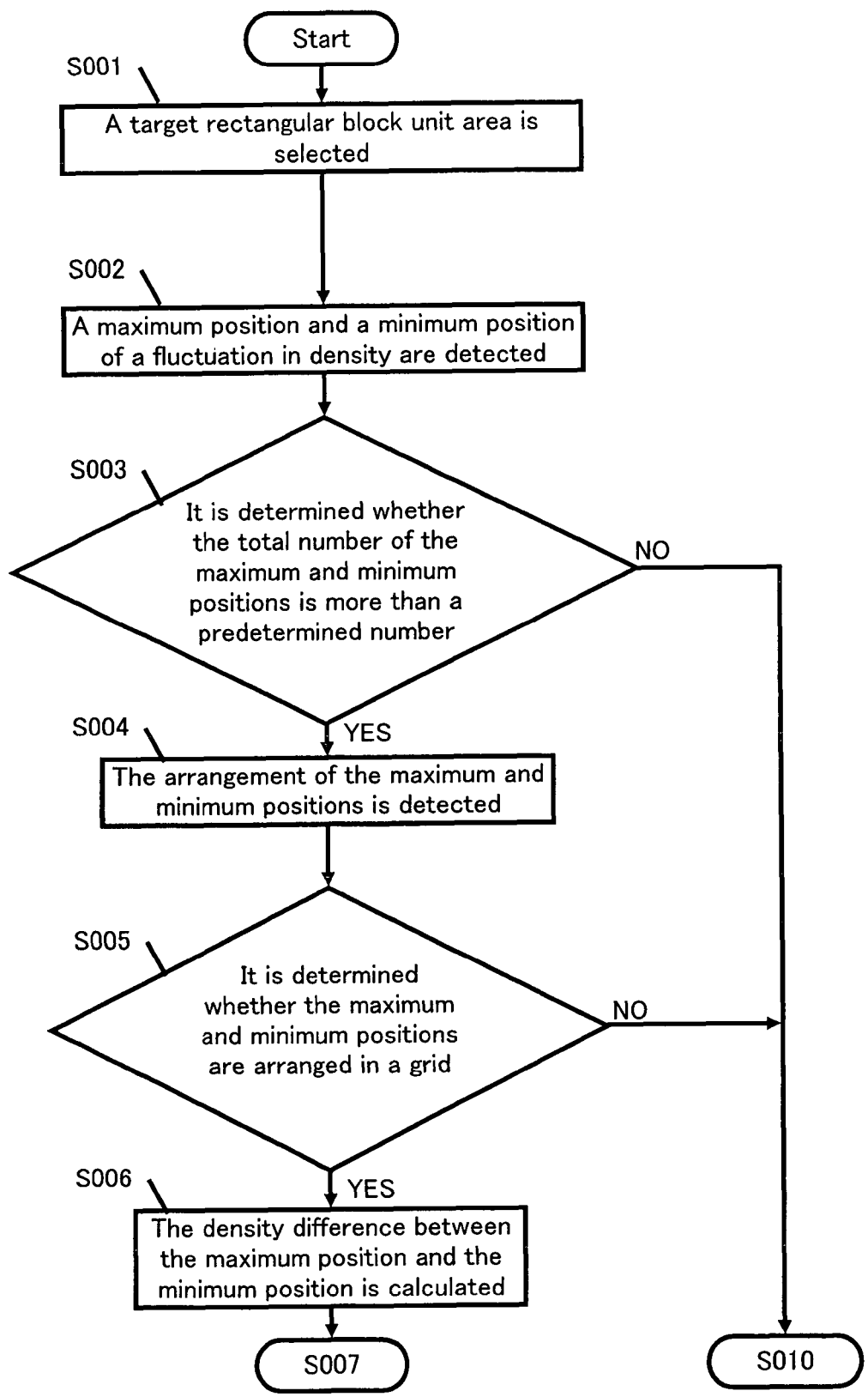
FIGS. 3A and 3B are general flowcharts according to a first embodiment.
Figure 3B:
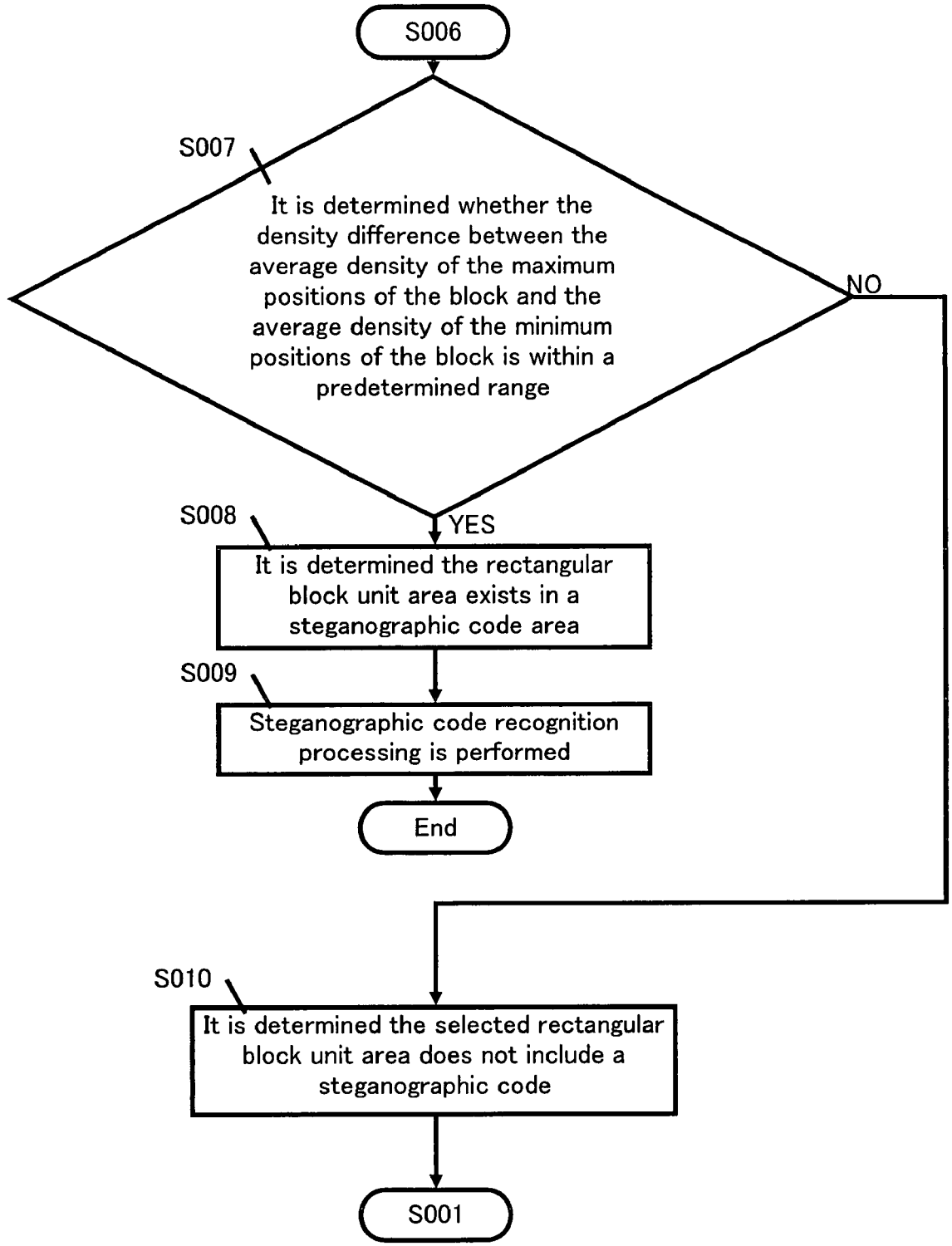

FIGS. 3A and 3B are flowcharts of details of a steganographic code determination process according to the first embodiment.

In step S001, a target rectangular block unit area is selected in an image to be processed. Here, the rectangular block unit area is sequentially selected starting from an arbitrary position in the image. The rectangular block unit area is usually selected by scanning the image from the upper left corner of the image, or by scanning the image from the center of the image to the periphery. By selecting the rectangular block unit area starting from a position at which a code is more likely to exist in accordance with the characteristics of the image to be processed, the code can be more quickly detected, whereby a processing time can be shortened.

In step S002, a maximum position and a minimum position of a fluctuation in density are detected. If the density of a target pixel is higher than that of a pixel adjacent to the target pixel, and if the density difference between the target pixel and the adjacent pixel is equal to or higher than a predetermined value, the target pixel is detected as the maximum position. If the density of a target pixel is lower than that of the adjacent pixel, and if the density difference between the target pixel and the adjacent pixel is equal to or higher than a predetermined value, the target pixel is detected as the minimum position.

In step S003, it is determined whether the total number of the maximum and minimum positions is more than a predetermined number. Here, if the rectangular block unit area selected in step S001 does not include a steganographic code, for example, if the rectangular block unit area is a margin area, the total number of the maximum and minimum positions becomes fewer. Accordingly, it can be immediately determined that the rectangular block unit area does not include a steganographic code. If the total number of the maximum and minimum positions is more than the predetermined number, the process proceeds to step S004. On the other hand, if the total number of the maximum and minimum positions is less than the predetermined number, the process proceeds to step S010. In step S010, it is determined that the selected rectangular block unit area does not include a steganographic code, and then the process ends. Subsequently, the process returns to step S001 in which the next rectangular block unit area is selected.

In step S004, the arrangement of the maximum and minimum positions is detected.

Figure 4:
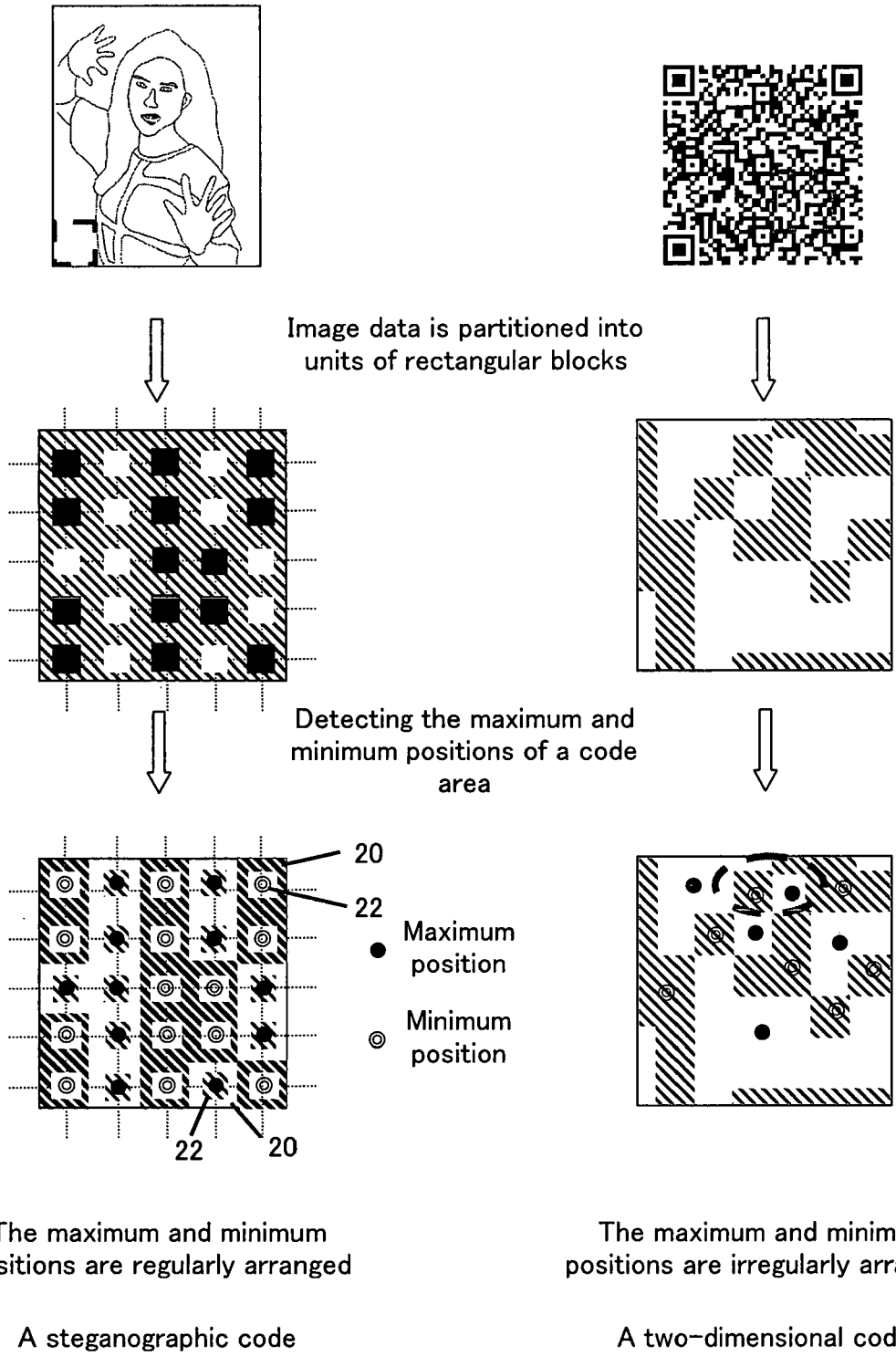
FIG. 4 is a (first) diagram showing a steganographic feature value.

In step S005, it is determined whether the maximum and minimum positions are arranged in a grid. Here, states in which the maximum and minimum positions of a steganographic code area are detected, and in which the detected maximum and minimum positions are arranged in a grid are shown in FIG. 4. As a comparative example, a state in which the maximum and minimum positions of a two-dimensional code area are detected and the detected maximum and minimum positions are shown. As is apparent from FIG. 4, in the case of the steganographic code, since density processing is performed upon the center part of a block 20, the maximum and minimum positions are regularly arranged. The block 20 is comprised of a plurality of pixels 21 shown in FIG. 13 and the center part of the block 20 is a predetermined area 22 Shown in FIG. 13. On the other hand, in the case of the two-dimensional code, the maximum and minimum positions are irregularly arranged. Accordingly, by focusing on the arrangement of the maximum and minimum positions, the steganographic code can be distinguished from the two-dimensional code. If the maximum and minimum positions are arranged in a grid, the process proceeds to step S006. On the other hand, if the maximum and minimum positions are not arranged in a grid, the process proceeds to step S010. In step S010, it is determined that the selected rectangular block unit area does not include a steganographic code, and then the process ends. Subsequently, the process returns to step S001 in which the next rectangular block unit area is selected.

In step S006, the density difference between the maximum position and the minimum position is calculated.

Figure 5:
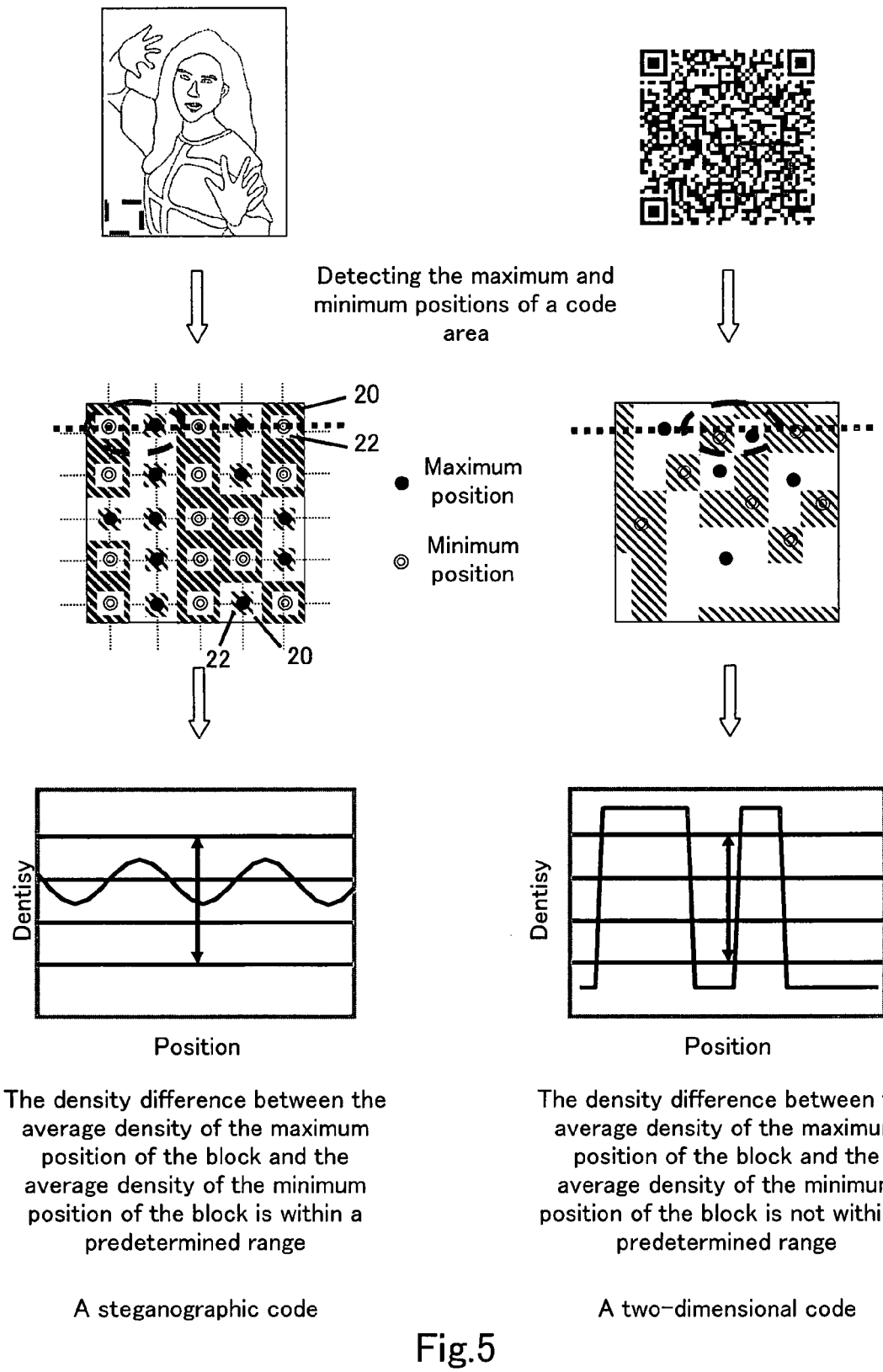
FIG. 5 is a (second) diagram showing a steganographic feature value.

In step S007, the average density of the maximum positions of the block and the average density of the minimum positions of the block, one of the maximum positions and one of the minimum positions forming a pair and being adjacent to each other in a one-dimensional direction, are calculated, and it is determined whether the density difference between them is within a predetermined range. The density level differences between the maximum positions and the minimum positions in a steganographic code area are shown in FIG. 5. In addition, as a comparative example, the density level differences between the maximum positions and the minimum positions in a two-dimensional code area are shown. In the case of the steganographic code, the density level differences between the maximum positions and the minimum positions, one of the maximum positions and one of the minimum positions forming a pair, are within a predetermined range to prevent image deterioration. In contrast, in the case of the two-dimensional code, the density level differences between the maximum positions and the minimum positions, one of the maximum positions and one of the minimum positions forming a pair, are not within a predetermined range. Accordingly, by focusing on a density level difference, the steganographic code can be distinguished from the two-dimensional code. If the density difference is within a predetermined range, the process proceeds to step S008. On the other hand, if the density difference is not within a predetermined range, the process proceeds to step S010. In step S010, it is determined that the selected rectangular block unit area does not include a steganographic code, and then the process ends. Subsequently, the process returns to step S001 in which the next rectangular block unit area is selected.

In step S008, it is determined that the rectangular block unit area exists in a steganographic code area.

In step S009, steganographic code recognition processing is performed, and then the process ends.

Second Embodiment

In the first embodiment, the case in which it is only determined whether a selected rectangular block unit area is included in a steganographic code area has been described. However, a configuration in which it can be determined whether a rectangular block unit area is included in not only a steganographic code area but also a two-dimensional code area and a one-dimensional code area can be considered.

Figure 6A:
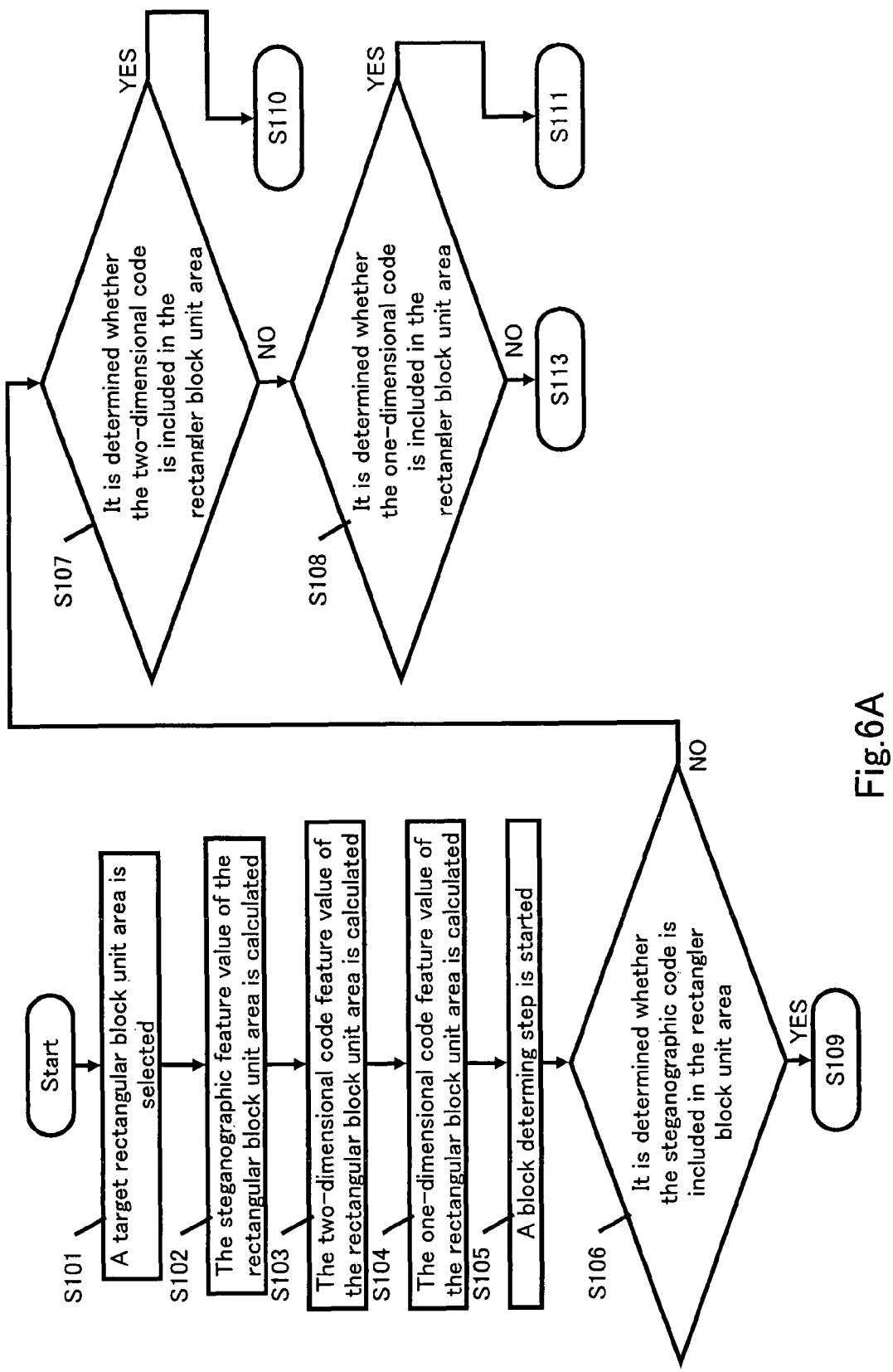
FIGS. 6A and 6B are general flowcharts according to a second embodiment.
Figure 6B:
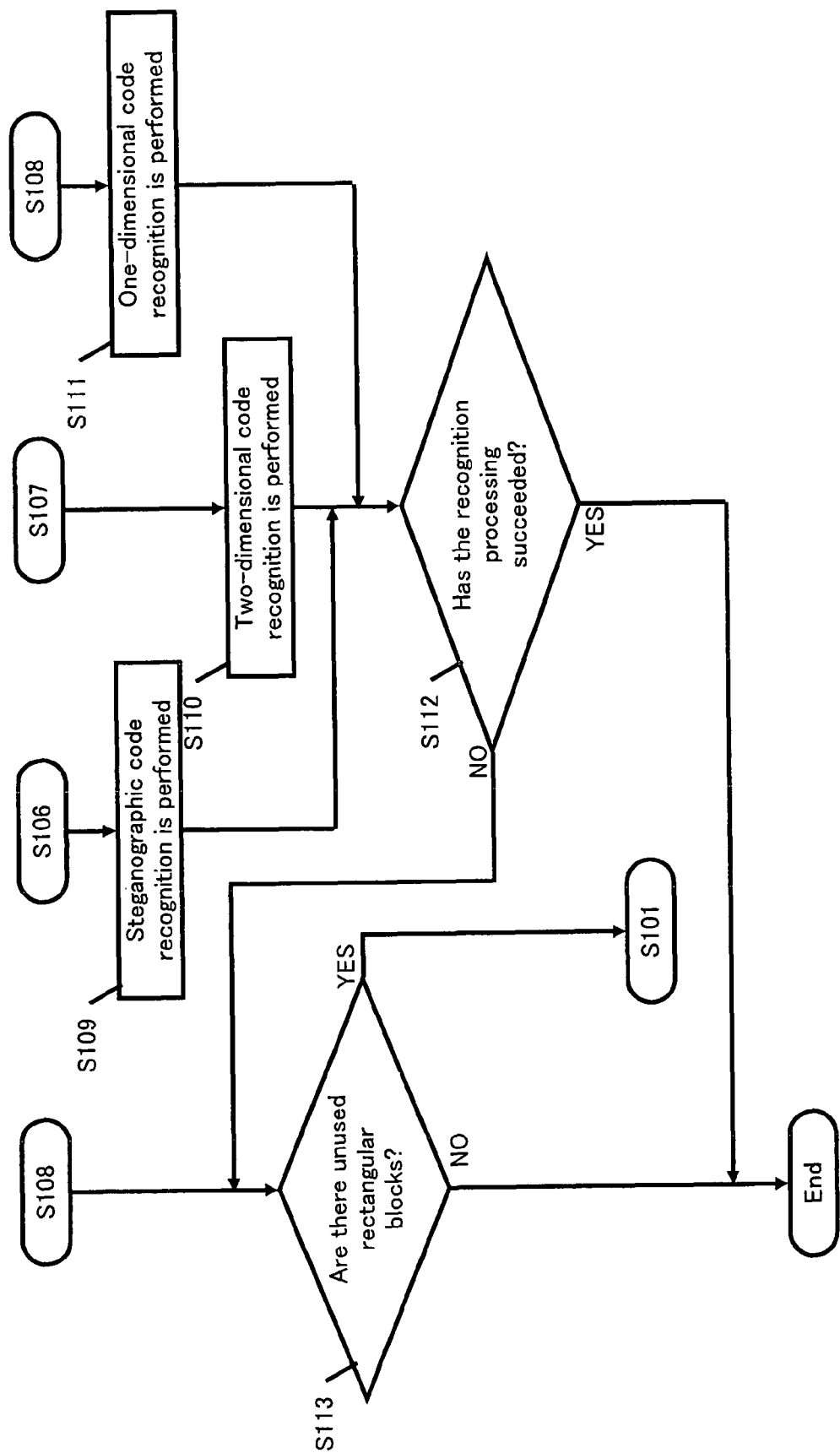

FIGS. 6A and 6B are flowcharts of details of a code determination process according to the second embodiment.

In step S101, a target rectangular block unit area is selected in an image to be processed.

In step S102, the steganographic feature value of the rectangular block unit area is calculated. This steganographic feature value calculation is as described in the first embodiment.

In step S103, the two-dimensional code feature value of the rectangular block unit area is calculated. This calculation of a two-dimensional code feature value will be described in detail with reference to FIGS. 9A and 9B.

In step S104, the one-dimensional code feature value of the rectangular block is calculated. This calculation of a one-dimensional code feature value will be described in detail with reference to FIGS. 10A and 10B.

From step S105, the determination of whether any one of the steganographic code, two-dimensional code, and one-dimensional code is included in the rectangular block unit area on the basis of the individual feature values is started.

In step S106, it is determined whether the steganographic code is included in the rectangular block unit area. If the steganographic code is included, the process proceeds to step S109. In step S109, steganographic code recognition is performed, and then the process proceeds to step S112. On the other hand, if the steganographic code is not included, the process proceeds to step S107.

In step S107, it is determined whether the two-dimensional code is included in the rectangular block unit area. If the two-dimensional code is included, the process proceeds to step S110. In step S110, two-dimensional code recognition is performed, and then the process proceeds to step S112. On the other hand, if the two-dimensional code is not included, the process proceeds to step S108.

In step S108, it is determined whether the one-dimensional code is included in the rectangular block unit area. If the one-dimensional code is included, the process proceeds to step S111. In step S111, one-dimensional code recognition is performed, and then the process proceeds to step S112. On the other hand, if the one-dimensional code is not included, it is determined that no code is included, and then the process proceeds to step S113.

In step S112, recognition processing is performed. If the recognition processing has succeeded, the recognized code is output, and then the process ends. On the other hand, if the recognition processing has failed, the process proceeds to step S113. Here, the failure of the recognition processing means that the recognition processing could not be performed due to the fact that a part of the code was blurred or the code was shielded by something.

In step S113, if there are unused rectangular blocks, a similar process will be repeatedly performed upon the rectangular blocks, and therefore the process returns to step S101.

In the following, the calculation of a two-dimensional code feature value performed in step S103 of FIG. 6A and the calculation of a one-dimensional code feature value performed in step S104 of FIG. 6A will be described. As shown in FIG. 1, both of the one-dimensional and two-dimensional codes are printed using two high-contrast colors such as white and black. Therefore, large variations (a large dispersion) in or a large standard deviation of the gradation values of pixels occurs. In contrast, in an area where characters are printed, the ratio of a character color area to a ground color area becomes small, and the variations in the gradation values of pixels are reduced. In addition, in an area where a photograph or the like is printed, the gradation value of a pixel is an arbitrary value, and the variations in the gradation values of pixels are reduced. By making use of the above-described characteristics, a block in which variations in the gradation values of pixels fall within a predetermined range is detected, whereby an area including the one-dimensional or two-dimensional code can be detected. In particular, in the two-dimensional code area, a code is created so that the ratio of a white color area to a black color area can fall within a predetermined range, for example, 50%±10%. By detecting a block in which the ratio of white pixels to black pixels falls within a predetermined range, only the area including the two-dimensional code can be detected.

FIG. 7 is a diagram describing a code determination method using the number of edges. In the case of the one-dimensional code in which data is represented using a combination of parallel straight lines, if pixels are extracted in a line perpendicular to bars, points (edges), at each of which the gradation values of the pixels in the line significantly vary, corresponding to the number of the bars perpendicular to the line exist regardless of where the line exists in the code. However, if pixels are extracted in a line parallel to the bars, no edge exists. On the other hand, in the case of the two-dimensional code in which data is represented using a combination of two-dimensionally arranged light and dark dots (cells), and in which the individual numbers of the light dots and the dark dots are controlled to be equal as much as possible, the number of edges representing points, at each of which the gradation values of pixels significantly vary, is almost the same regardless of whether pixels are extracted from a horizontal or vertical line. Accordingly, by detecting a block in which the numbers of edges in a horizontal line and a vertical line fall within a predetermined range, only an area including a one-dimensional or two-dimensional code can be accurately detected, and the one-dimensional and two-dimensional codes can be easily distinguished from each other.

FIG. 8 is a diagram describing a code determination method using a line correlation. The line correlation indicates a cross-correlation function calculated from the pixel values of two parallel straight lines extracted from a code. In the case of the one-dimensional code, if two parallel straight lines are extracted in a direction perpendicular to bars, the individual patterns of changes in pixel values in the two straight lines are the same, and therefore, the cross-correlation function becomes larger. If the two parallel straight lines are extracted in a direction parallel to the bars, the individual patterns of changes in pixel values in the two straight lines are different, and therefore, the cross-correlation function becomes smaller. On the other hand, in the case of the two-dimensional code, the cross-correlation function becomes smaller, because the individual patterns of changes in pixel values in two straight lines are different regardless of whether two horizontal or vertical straight lines are extracted. Accordingly, by detecting a block in which the line correlation values between vertical lines and horizontal lines fall within a predetermined range, an area including the one-dimensional or two-dimensional code can be accurately detected, and, in addition, the one-dimensional and two-dimensional codes can be easily distinguished from each other.

Figure 9A:
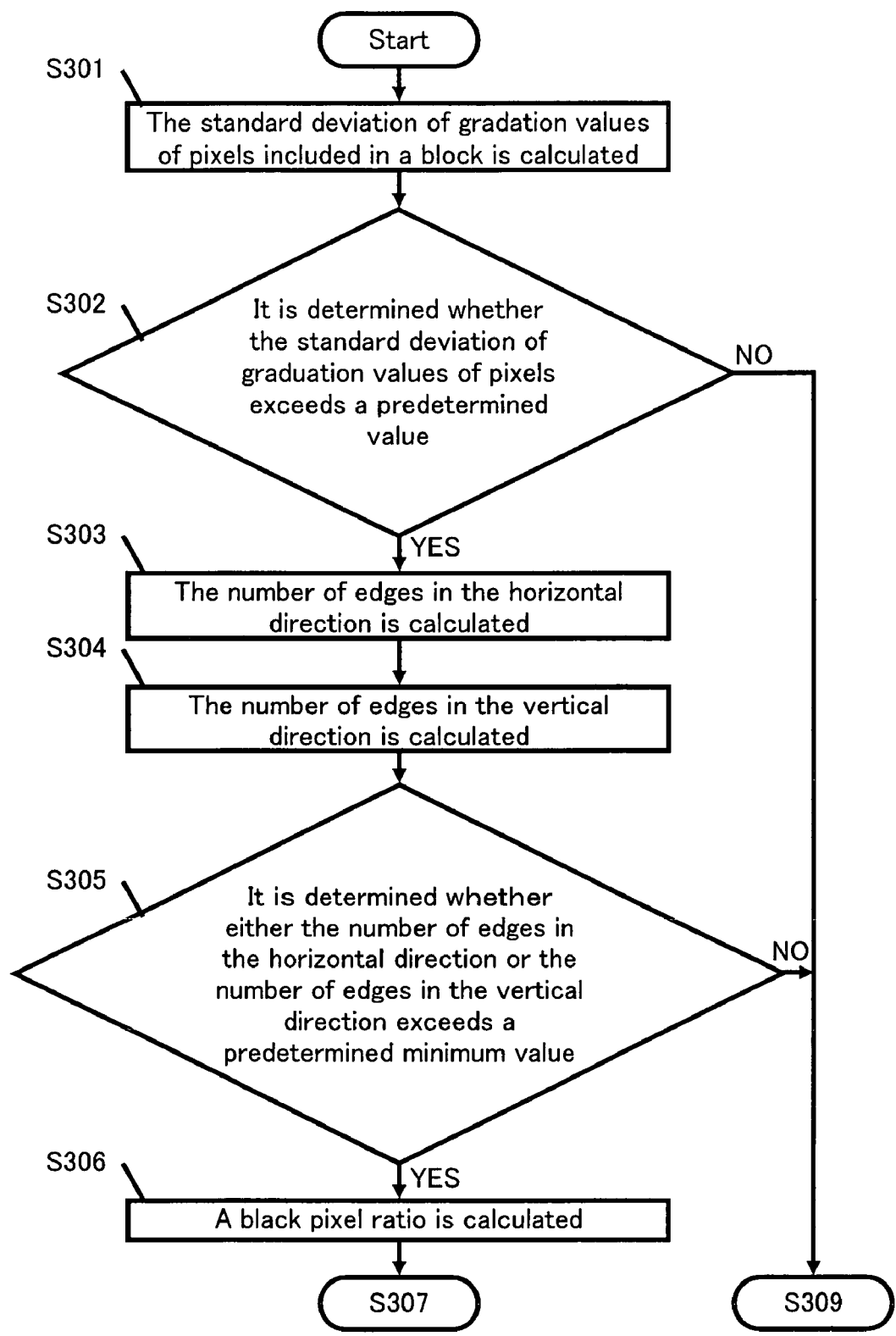
FIGS. 9A and 9B are flowcharts of details of two-dimensional code determination processing.
Figure 9B:
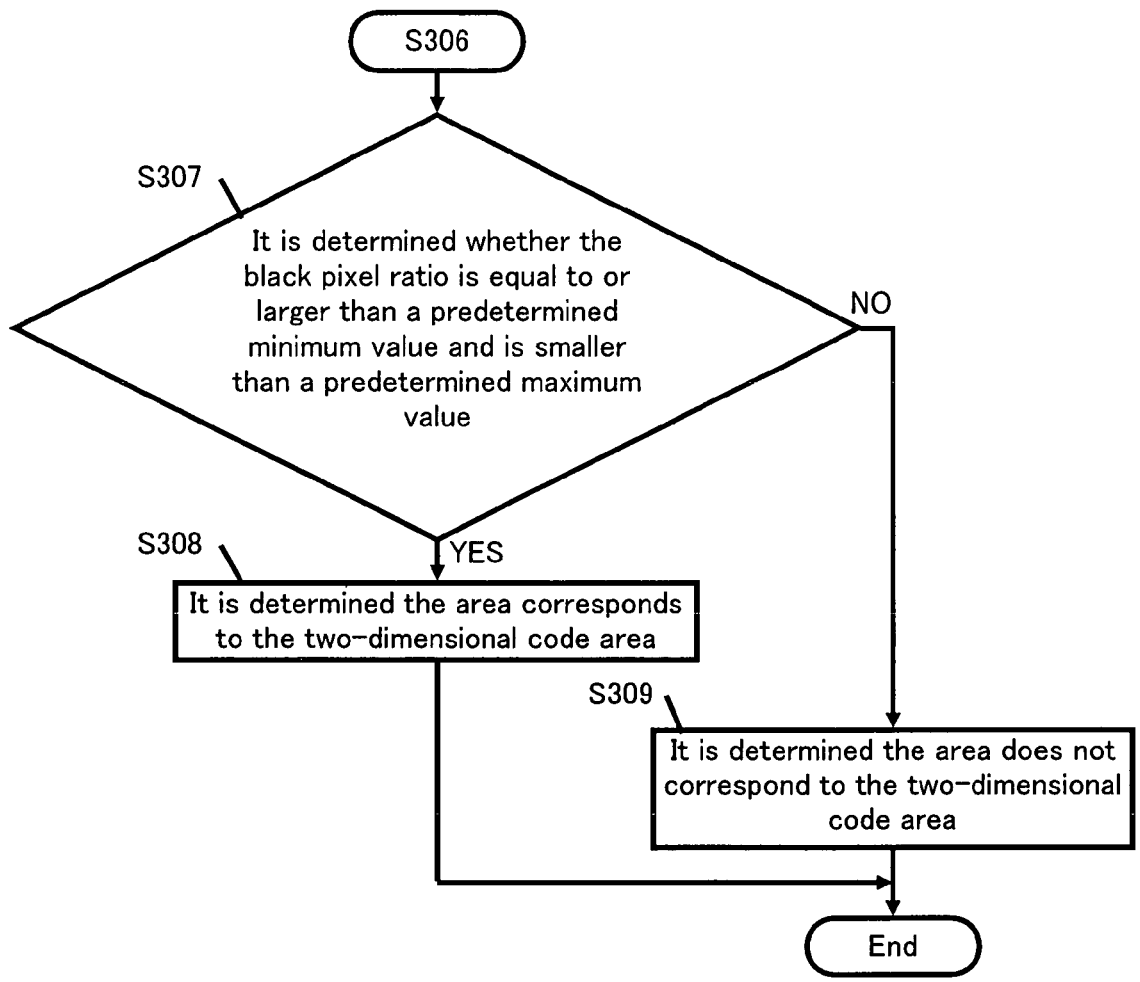

FIGS. 9A and 9B are flowcharts of details of the two-dimensional code determination processing performed in step S103 of FIG. 6A. In FIGS. 9A and 9B, after the process has been started, first, in step S301, the standard deviation of gradation values of pixels included in a block is calculated.

In step S302, it is determined whether the standard deviation of gradation values of pixels which has been calculated in step S301 exceeds a predetermined value. If the standard deviation exceeds the predetermined value, the process proceeds to step S303. On the other hand, if the standard deviation does not exceed the predetermined value, the process proceeds to step S309. In step S309, it is determined that the area does not correspond to the two-dimensional code area, and then the process ends.

In step S303, the number of edges in the horizontal direction is calculated.

In step S304, the number of edges in the vertical direction is calculated.

In step S305, it is determined whether either the number of edges in the horizontal direction which has been calculated in step S303 or the number of edges in the vertical direction which has been calculated in step S304 exceeds a predetermined minimum value. If it exceeds the predetermined minimum value, the process proceeds to step S306. On the other hand, if it does not exceed predetermined minimum value, the process proceeds to step S309. In step S309, it is determined that the area does not correspond to the two-dimensional code area, and then the process ends.

In step S306, a black pixel ratio is calculated.

In step S307, it is determined whether the black pixel ratio calculated in step S306 is equal to or larger than a predetermined minimum value and is smaller than a predetermined maximum value. If these conditions are met, the process proceeds to step S308. On the other hand, if these conditions are not met, the process proceeds to step S309. In step S309, it is determined that the area does not correspond to the two-dimensional code area, and then the process ends.

In step S308, it is determined that the area corresponds to the two-dimensional code area, and then the process ends.

Figure 10A:
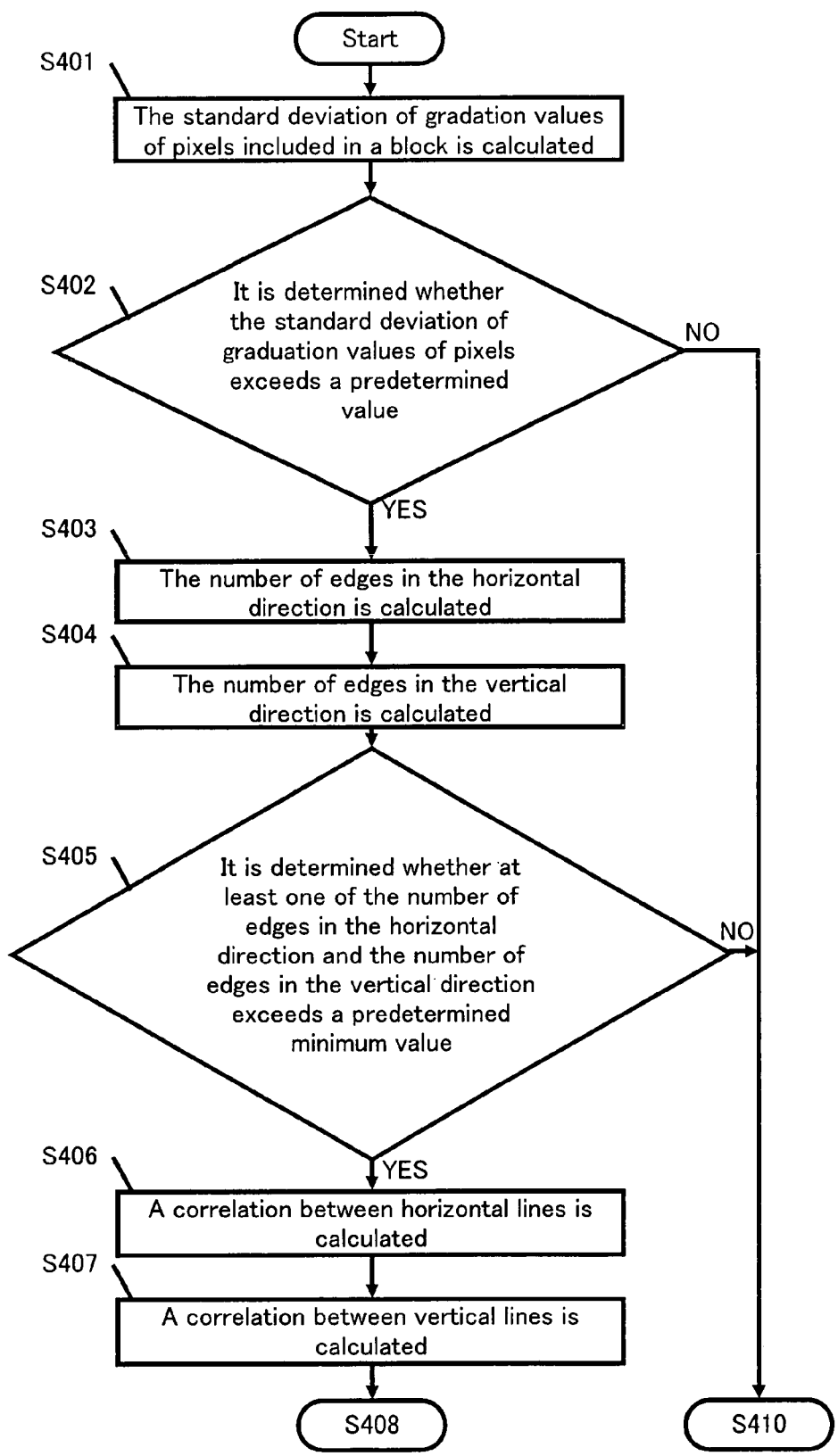
FIGS. 10A and 10B are flowcharts of details of one-dimensional code determination processing.
Figure 10B:
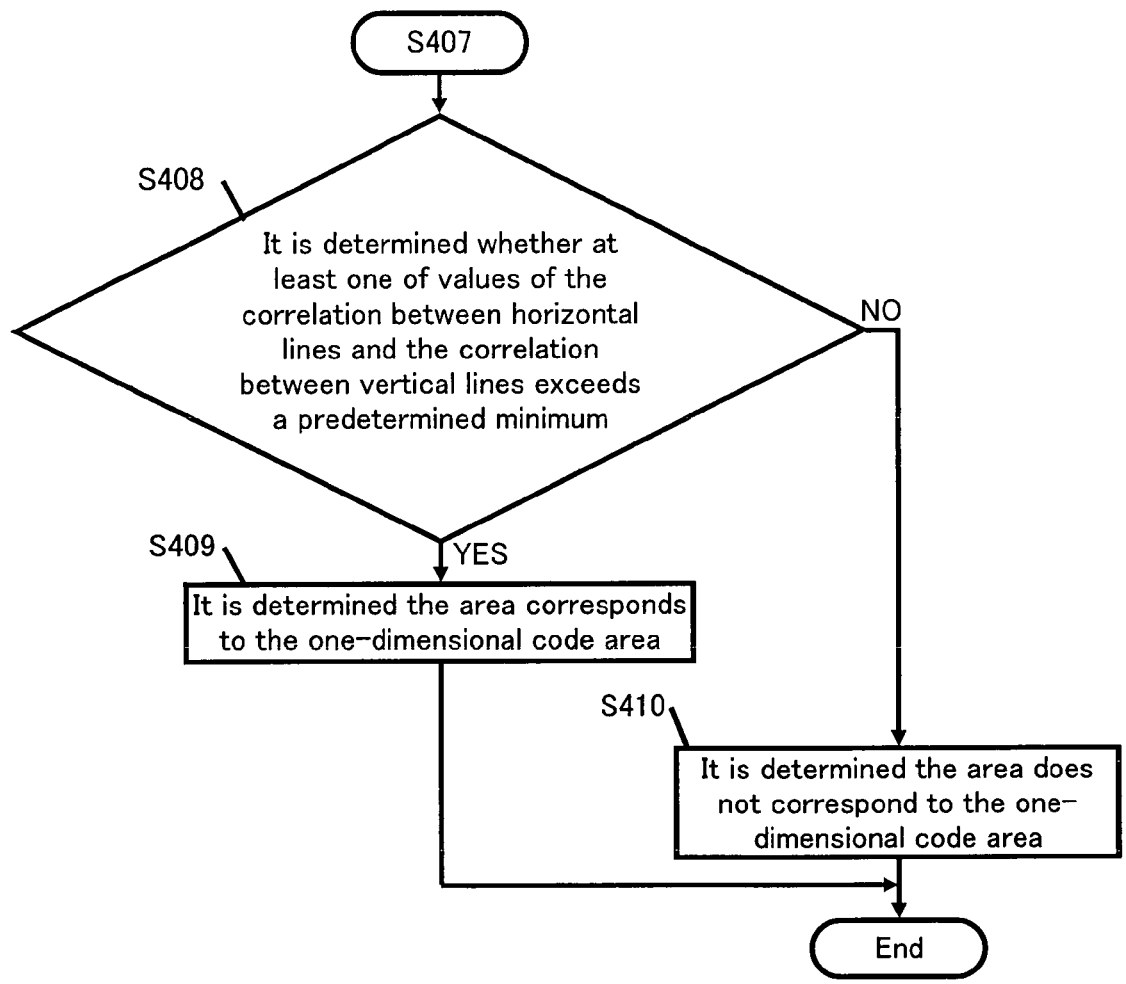

FIGS. 10A and 10B are flowcharts of details of the one-dimensional code determination processing performed in step S104 of FIG. 6A. In FIGS. 10A and 10B, after the process has been started, first, in step S401, the standard deviation of gradation values of pixels included in a block is calculated.

In step S402, it is determined whether the standard deviation of gradation values of pixels which has been calculated in step S401 exceeds a predetermined value. If the standard deviation exceeds the predetermined value, the process proceeds to step S403. On the other hand, if the standard deviation does not exceed the predetermined value, the process proceeds to step S410. In step S410, it is determined that the area does not correspond to the one-dimensional code area, and then the process ends.

In step S403, the number of edges in the horizontal direction is calculated.

In step S404, the number of edges in the vertical direction is calculated.

In step S405, it is determined whether at least one of the number of edges in the horizontal direction and the number of edges in the vertical direction exceeds a predetermined minimum value. If the condition is met, the process proceeds to step S406. On the other hand, if the condition is not met, the process proceeds to step S410. In step S410, it is determined that the area does not correspond to the one-dimensional code area, and then the process ends.

In step S406, a correlation between horizontal lines is calculated.

In step S407, a correlation between vertical lines is calculated.

In step S408, it is determined whether at least one of values of the correlation between horizontal lines and the correlation between vertical lines exceeds a predetermined minimum value. If the condition is met, the process proceeds to step S409. On the other hand, if the condition is not met, the process proceeds to step S410. In step S410, it is determined that the area does not correspond to the one-dimensional code area, and then the process ends.

In step S409, it is determined that the area corresponds to the one-dimensional code area, and then the process ends.

Third Embodiment

In the second embodiment, after the feature values of a steganographic code, a two-dimensional code, and a one-dimensional code have been calculated, the code determination processing and code recognition processing of a block are performed. However, a configuration in which the code recognition processing is performed soon after the calculation of each feature value has been performed can be considered. In addition, a configuration in which the order of calculation of the feature value of a code is decided can be considered.

Figure 11A:
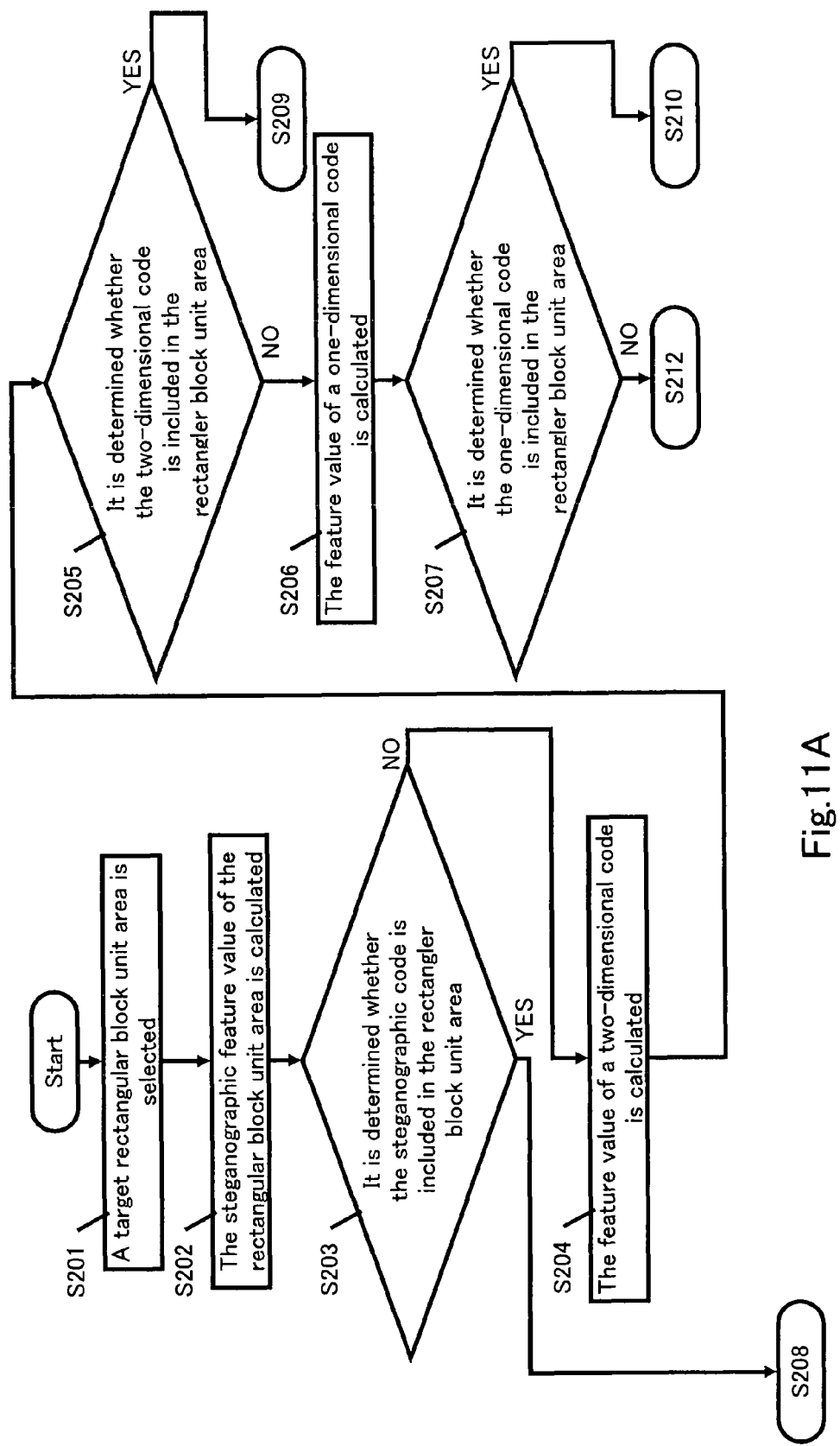
FIGS. 11A and 11B are general flowcharts according to a third embodiment.
Figure 11B:
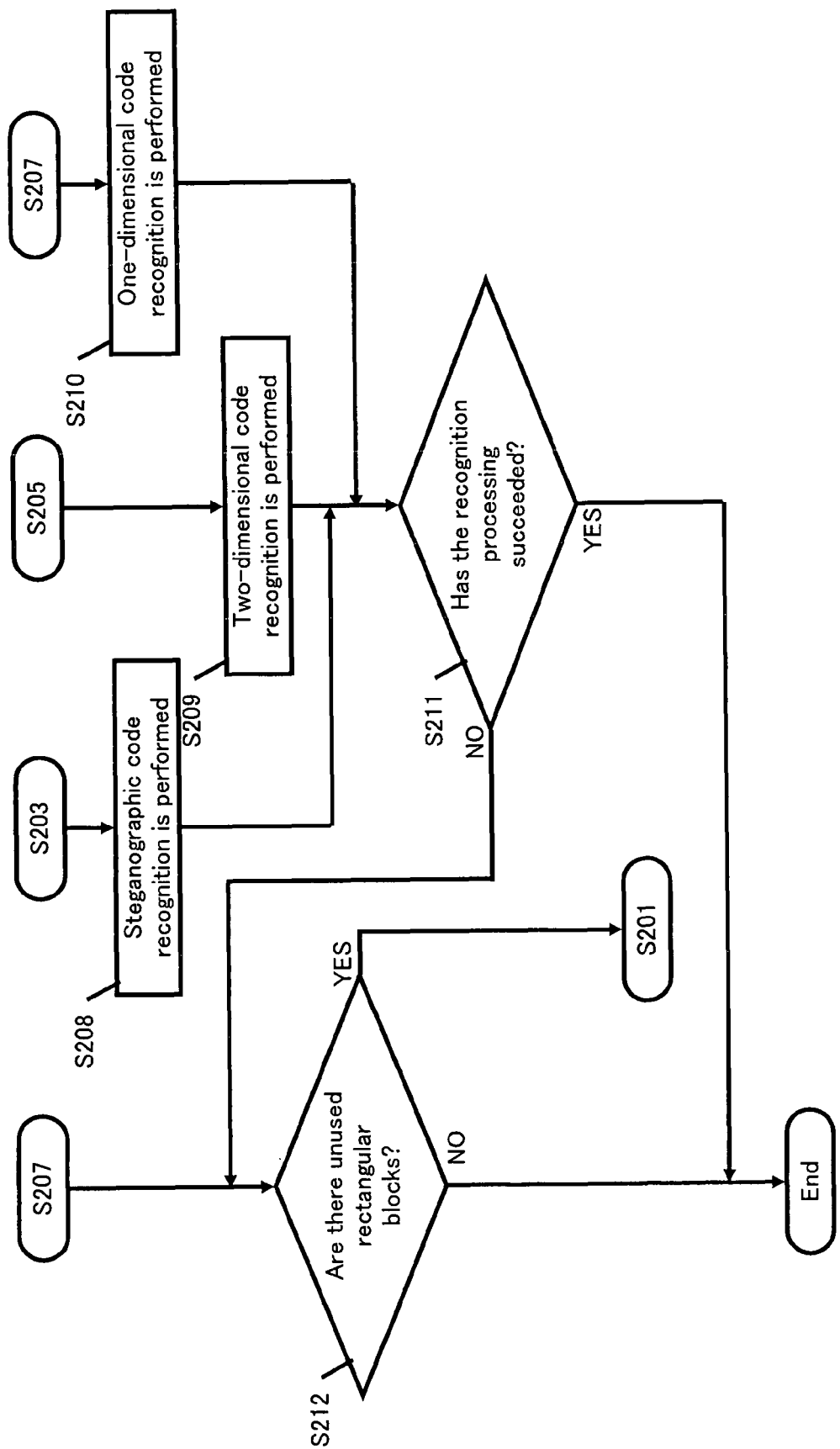

FIGS. 11A and 11B are flowcharts of details of a code determination process according to the third embodiment. In the third embodiment, the highest priority is assigned to steganographic code recognition, but may be assigned to two-dimensional or one-dimensional code recognition.

In step S201, a target rectangular block unit area is selected from among rectangular block unit areas to be processed.

In step S202, the steganographic feature value of this rectangular block unit area is calculated. This steganographic feature value calculation is as described in the first embodiment.

In step S203, it is determined whether the steganographic code is included in the rectangular block unit area. If the steganographic code is included, the process proceeds to step S208. In step S208, steganographic code recognition is performed, and then the process proceeds to step S211. On the other hand, if the steganographic code is not included, the process proceeds to step S204.

In step S204, the feature value of a two-dimensional code is calculated. This calculation of a two-dimensional code feature value is as described in the second embodiment.

In step S205, it is determined whether the two-dimensional code is included in the rectangular block unit area. If the two-dimensional code is included, the process proceeds to step S209. In step S209, two-dimensional code recognition is performed, and then the process proceeds to step S211. On the other hand, if the two-dimensional code is not included, the process proceeds to step S206.

In step S206, the feature value of a one-dimensional code is calculated. This calculation of a one-dimensional code feature value is as described in the second embodiment.

In step S207, it is determined whether the one-dimensional code is included in the rectangular block unit area. If the one-dimensional code is included, the process proceeds to step S210. In step S210, one-dimensional code recognition is performed, and then the process proceeds to step S211. On the other hand, if the one-dimensional code is not included, the process proceeds to step S212.

In step S211, recognition processing is performed. If the recognition processing has succeeded, the recognized code is output, and then the process ends. On the other hand, if the recognition processing has failed, the process proceeds to step S212.

In step S212, it is determined whether there are unused rectangular blocks. If there are unused blocks, a similar process will be repeatedly performed upon the blocks, and therefore, the process returns to step S201. On the other hand, if there is no unused block, the process ends.

As described previously, the details of a code image processing method according to an embodiment of the present invention have been described. A code image processing apparatus performing the method can be configured with a portable terminal device or a general computer system as a major component. FIG. 12 is a block diagram of a configuration of such a computer system, that is, a hardware environment.

In FIG. 12, the computer system is provided with a CPU 1, a ROM 2, a RAM 3, a communication interface 4, a storage device 5, an image reading unit 6, a reader 7 for a portable storage medium 11, and a bus 8 that connects these components. Various types of storage devices such as a hard disk and a magnetic disk can be used as the storage device 5. A program stored in the ROM 2 or the storage device 5 is executed by the CPU 1, whereby steganographic code area detection according to an embodiment of the present invention can be achieved. Such a program can be stored in, for example, the storage device 5 via the communication interface 4 by an information provider. Alternatively, after the program has been stored on the portable storage medium 11 that is commercially available and is in circulation and then the portable storage medium 11 has been attached to the reader 7, the program can be executed by the CPU 1. Various types of storage media such as a CD-ROM, an optical disc, and a DVD can be used as the portable recording medium 11. A program stored on such a recording medium is read out by the reader 7, whereby steganographic code image processing according to an embodiment of the present invention can be achieved. In addition, by reading out an image from the image reading unit 6, code processing can be achieved. Even if a portable terminal device having an image reading unit is used to store the program, the code image processing according to an embodiment of the present invention can be performed.

What is claimed is:

1. An image data processing apparatus, comprising:
a central processing unit for controlling a process of determining a type of code included in image data comprising a plurality of blocks, each block comprising a plurality of pixels, the process comprising:
detecting a maximum position where a degree of pixel value of a predetermined area in one of said blocks being higher than that of another area in said blocks, and a minimum position where a degree of pixel value of a predetermined area in one of said blocks being lower than that of another area in said blocks;
repeating said detecting of maximum and minimum positions in other blocks; and
determining a type of code included in said image data based upon whether the detected maximum and minimum positions are regularly arranged.

2. The image data processing apparatus of claim 1, wherein said process further comprises, determining a type of code included in said image data on the basis of difference of an average density of pixel value between adjacent maximum or minimum positions.

3. The image data processing apparatus of claim 1, wherein an area positioned at a center of each block is selected as a predetermined area.

4. The image data processing apparatus of claim 1, wherein a pixel positioned at a center of each block is selected as a predetermined area.

5. A determining method of a type of code included in image data comprising a plurality of blocks, each block comprising a plurality of pixels, the method comprising:
detecting using a computer maximum position where a degree of pixel value of a predetermined area in one of said blocks being higher than that of another area in said blocks, and a minimum position where a degree of pixel value of a predetermined area in one of said blocks being lower than that of another area in said blocks;
repeating said detecting of maximum and minimum positions in other blocks; and
determining a type of code included in said image data based upon whether the detected maximum and minimum positions are regularly arranged.

6. The determining method of a type of code of claim 5, wherein the determining determines a type of code included in said image data on the basis of difference of an average density of pixel value between adjacent maximum or minimum portions.

7. The determining method of a type of code of claim 5, wherein an area positioned at a center of each block is selected as a predetermined area.

8. The determining method of a type of code of claim 5, wherein a pixel positioned at a center of each block is selected as a predetermined area.

9. A computer-readable recording medium that stores a computer program for determining method of a type of code included in image data comprising a plurality of blocks, each block comprising a plurality of pixels, by controlling a image data processing apparatus according to a process comprising:
detecting maximum position where a degree of pixel value of a predetermined area in one of said blocks being higher than that of another area in said blocks, and a minimum position where a degree of pixel value of a predetermined area in one of said blocks being lower than that of another area in said blocks;
repeating said detecting of maximum and minimum positions in other blocks; and
determining a type of code included in said image data based upon whether the detected maximum and minimum positions are regularly arranged.

10. The computer-readable recording medium of claim 9, wherein said process further comprises, determining a type of code included in said image data on the basis of difference of an average density of pixel value between adjacent maximum or minimum positions.

11. The computer-readable recording medium of claim 9, wherein an area positioned at a center of each block is selected as a predetermined area.

12. The computer-readable recording medium of claim 9, wherein a pixel positioned at a center of each block is selected as a predetermined area.

13. The image data apparatus according to claim 1, wherein the central processing unit determines that the type of code included in said image data is a steganographic code.

* * * * *

UNITED STATES PATENT AND TRADEMARK OFFICE
CERTIFICATE OF CORRECTION

| | | |
|---|---|---|
| PATENT NO. | : 7,920,737 B2 | Page 1 of 1 |
| APPLICATION NO. | : 11/783056 | |
| DATED | : April 5, 2011 | |
| INVENTOR(S) | : Yamaguchi et al. | |

It is certified that error appears in the above-identified patent and that said Letters Patent is hereby corrected as shown below:

Column 10, Line 25 in Claim 5, delete "detecting using a computer" and insert -- using a computer detecting a --, therefor.

Column 10, Line 52 in Claim 9, after "detecting" insert -- a --.

Signed and Sealed this
Twenty-eighth Day of June, 2011

David J. Kappos
*Director of the United States Patent and Trademark Office*